Jan. 3, 1967   D. W. HAWK   3,295,234

SCRAPER PIVOT JOINT

Filed May 13, 1964

Inventor
Dale W. Hawk
By Charles L. Schwab
Attorney

United States Patent Office 3,295,234
Patented Jan. 3, 1967

3,295,234
SCRAPER PIVOT JOINT
Dale W. Hawk, Marion, Iowa, assignor to Allis-Chalmers Manufacturing Company, Milwaukee, Wis.
Filed May 13, 1964, Ser. No. 366,991
8 Claims. (Cl. 37—129)

This invention relates to a pivot joint for connecting the draft frame and apron to the side walls of a scraper bowl.

It is an object of this invention to provide a superior pivot joint for the apron and draft frame of a motor scraper, the latter being of the type having a bowl with vertical side wall structures presenting a pair of laterally spaced vertical walls and wherein the apron arms are disposed between these walls.

It is a further object of this invention to provide a pivot joint for the apron and draft frame for a scraper utilizing a pair of telescoping pivot members, one of which may be removed to disconnect the draft frame from the scraper without necessitating removal of the other pivot member or the apron.

It is a further object of this invention to provide a pivot joint for a pair of pivoted members which are supported by a pair of vertical walls wherein one of the pivoted members is disposed between the walls and the other pivoted member is on the outer side of one of said walls and wherein the pivot joint not only serves to support the pivoted members but serves to reinforce the walls by rigidly interconnecting them.

These and other objects and advantages of this invention will be apparent when the following description is read in conjunction with the drawing, in which.

Figure 1:
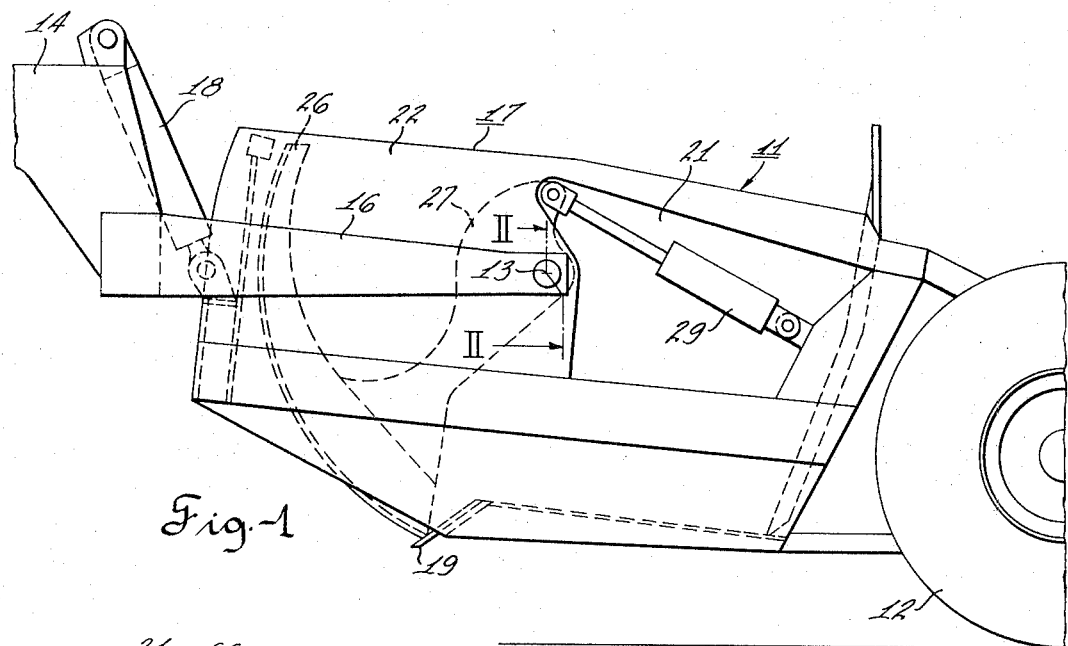
FIG. 1, is a side view of an earthmover in which the present invention is incorporated.
Figures 2, 3:
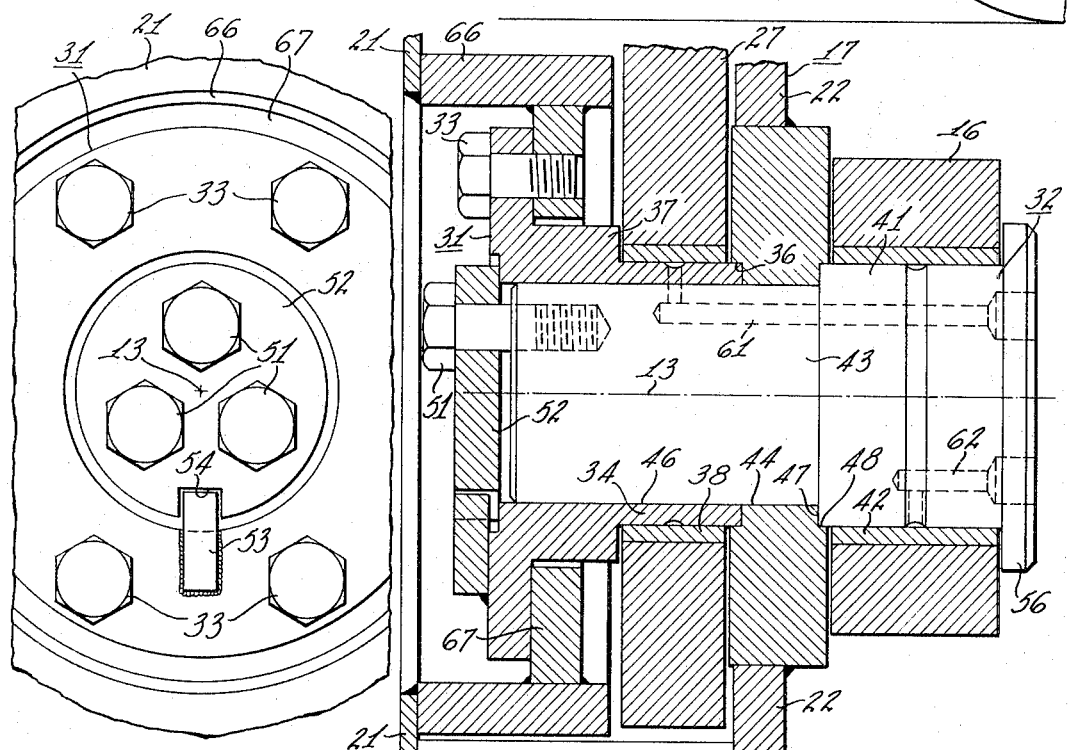
FIG. 2, is a section taken along the line II—II in FIG. 1, showing the pivot joint of this invention.
FIG. 3, is an end view of the pivot joint shown in FIG. 2.

Referring to FIG. 1, the illustrated earthmover includes a scraper bowl 11 supported at its rear end by a pair of rubber tires 12, only one of which is shown, and a draft frame 14 pivotally connected on a transverse axis 13 to the bowl 11. The draft frame has a pair of rearwardly extending legs 16, only one of which is illustrated, which are disposed at the laterally outer sides of the side wall structures 17 at opposite lateral sides of the bowl 11. A lift ram 18 is interconnected between frame 14 and bowl 11 so as to raise and lower the cutting edge 19 of the bowl between excavating and transporting positions. Referring also to FIG. 2, the side wall structure 17 of the bowl includes a pair of laterally spaced vertical walls 21, 22. The inner vertical wall 21 and the outer vertical wall 22 are rigidly interconnected by suitable means including transverse bracing member 23. The apron 26 has a pair of laterally spaced arms 27, only one of which is shown, which extend through an opening between the walls 21 and 22. The arms 27 are pivotally connected to the side walls 17 of the bowl and to double acting hydraulic actuators 29, only one of which is shown. The relationship between the side wall structure, the apron draft frame and apron actuators is more fully described in copending patent application Serial Number 374,528 filed June 11, 1964 of mine and Harvey W. Rockwell.

Referring to FIGS. 2 and 3, the illustrated embodiment of my pivot joint includes a pair of telescoping pivot members in the form of a sleeve 31 and a pin 32. The sleeve 31 is releasably secured to the inner wall 21 by a plurality of cap screws 33. A sleeve 31 has a hollow cylindrical bearing portion 34 disposed intermediate the walls 21, 22, the end of which is piloted in a counterbore 36. A radially outward extending shoulder 37 is formed on the sleeve at the other end of the cylindrical portion 34 to serve as a lateral positioner for the apron arm 27 pivotally connected to the cylindrical bearing portion 34. A bearing sleeve 38 of suitable material may be interposed between the bearing portion 34 and the apron arm 27. The pin 32 has a journal portion 41 to which the leg 16 of the draft frame is pivotally connected. A sleeve bearing 42 of suitable material may be interposed between the journal 41 and draft frame leg 16. A cylindrical pilot portion 43 of the pin 32 is of less diameter than the journal portion 41 and extends through a bore 44 in the outer wall 22 and into the coaxial journal or bore 46 of the sleeve 31. The cylindrical portion 43 of the pin 32 is in radial thrust engaging relation with the bore 44 of the outer wall 22 and with the bore 46 of the sleeve 31. The stepped diameter construction of the pin 32 provides a shoulder 47 which is piloted in a counterbore 48 at the outer end of the bore 44. The sleeve 31 and pin 32 are in radial thrust engaging relation with the counterbores 36 and 48 at opposite ends of bore 44, thus providing excellent load carrying ability. The pin 32 is releasably secured to the sleeve 31 by a plurality of cap screws 51 and a washer 52.

The pin 32 is held against rotation relative to the sleeve 31 and side walls 21, 22 by a key 53 welded to the sleeve 31 and a slot 54 in the washer 52 with which the key cooperates. An enlarged head portion 56 is formed on the pin 32 to prevent the arm 16 from disassociating itself from the journal 41. When the cap screws 51 are tightened the shoulder 47 is drawn into the counterbore 48 and the end of cylindrical portion 34 of the sleeve is drawn into firm engagement with the counterbore 36, thus providing a rigid interconnection between the walls 21, 22. This construction provides an exceptionally strong pivot and also reinforces the side wall structure. Suitable grease passages 61, 62 are provided for the apron and draft frame pivots. The inner end of the pivot connection is recessed within a pocket formed by a cylinder 66 welded to the wall 21 and a radially inward extending annular flange 67 to which the cap screws 33 are threadedly connected. Thus the material moving in and out of the bowl will not have as great a wearing effect on the inner end of the pivot joint as would be the case should such inner end not be disposed within a protective pocket such as that formed by members 66, 67.

From the foregoing description it is apparent that the sleeve and pin telescoping pivot members 31, 32 reinforce one another and the side walls 21, 22. Further it is seen that the draft arms 16 may be removed so that the frame 14 may be separated from the scraper bowl 11 by releasing the releasable fastening means in form of cap screws 51 and removing the pins 32. When this is done the apron arms 27 remain in position by virtue of their each being pivoted on sleeve 31 which need not be removed in the process of removing pin 32.

Although only one pivot joint of this invention is illustrated and described it should be understood that a pivot joint of reverse image is provided on the opposite side of the scraper bowl.

The embodiments of the invention for which an exclusive property or privilege is claimed are defined as follows:
1. A pivot joint for a scraper comprising:
   a scraper bowl having a pair of side wall structures each of which includes a pair of vertical walls in spaced relation to one another,
   a transverse horizontal bore through one of said walls,
   a counterbore in said one wall at the end of said bore in axially confronting relation to the other of said walls, a sleeve secured to said other wall having
   a cylindrical portion, one end of which is piloted in said counterbore, and
   a cylindrical opening axially aligned with said bore,
a pivot pin having
   a cylindrical portion in cooperative load carrying engagement with said opening in said sleeve,
   shoulder means on said pin in axial thrust transmitting relation to the side of said one wall remote from said other wall, and
   a pivot portion extending outwardly from said one wall in a direction away from said other wall,
means releasably securing said pin against axial movement relative to said sleeve,
an apron having an arm disposed between said walls and pivotally mounted on said cylindrical portion of said sleeve, and
a draft member pivotally mounted on said pivot portion of said pivot pin.

2. The structure set forth in claim 1 wherein said sleeve has a radially outward extending shoulder at the other end of said cylindrical portion forming an axial abutment for said apron arm.

3. A pivot joint for a scraper comprising:
a scraper bowl having a pair of side wall structures, each of which includes a pair of vertical walls secured in fixed laterally spaced relation to one another,
a transverse horizontal bore through one of said walls,
a counterbore in said one wall at the end of said bore in axially confronting relation to the other of said walls,
a sleeve releasably secured to said other wall and having
   a cylindrical portion, one end of which is piloted in said counterbore,
   a cylindrical opening axially aligned with said bore and
   a radially outward extending shoulder at the other end of said cylindrical portion transversely spaced from said one wall,
a pivot pin having
   a cylindrical portion in cooperative load carrying engagement with said bore and said opening in said sleeve,
   shoulder means on said pin in axial thrust transmitting relation to the side of said one wall remote from said other wall, and
   a pivot portion extending outwardly from said one wall in a direction away from said other wall,
means releasably securing said pin against axial movement relative to said sleeve,
an apron having an arm disposed between said walls and pivotally mounted on said cylindrical portion of said sleeve, and
a draft member pivotaly mounted on said pivot portion of said pivot pin.

4. The construction set forth in claim 3 and further comprising a second counterbore in said one wall at the end of said bore remote from said other wall and wherein said shoulder is piloted in said second counterbore.

5. Means for pivotally connecting an apron and a draft frame to a scraper bowl on a common axis comprising:
a vertical side wall structure on said bowl including
   a pair of laterally spaced inner and outer vertical walls,
a bore formed in said outer wall,
   counterbores formed in said outer wall at each end of said bore,
a pair of telescoping pivot members releasably fastened to one another, and to said walls,
   one of said pivot members having a hollow cylindrical bearing portion intermediate said walls piloted in said counterbore on the inner side of said outer wall,
   the other of said pivot members having a journal portion at the outer side of said outer wall and a cylindrical pilot portion of smaller diameter than said journal portion extending through said bore and into said hollow cylindrical bearing portion,
a shoulder on said other pivot member at the junction of said journal and pilot portions in radial and axial thrust transmitting relation to said outer wall,
an apron arm pivotally connected to said cylindrical bearing portion, and
a draft frame pivotally connected to said journal portion.

6. The structure set forth in claim 5 wherein said pilot portion of said other pivot member is in radial thrust transmitting engagement with said bore.

7. The structure set forth in claim 5 wherein said one pivot member is releasably secured to said inner wall, and said other pivot member may be removed without removing said one pivot member or said apron arm.

8. In combination:
a scraper bowl having a side wall structure including a pair of vertical walls rigidly interconnected and disposed in transversely spaced relation to one another,
a transverse horizontal bore in one of said walls,
a sleeve releasably secured at one end to said other wall and having its other end in axial thrust transmitting relation to said one wall,
a cylindrical portion on said sleeve in coaxial relation to said bore and disposed intermediate said walls,
a journal in said sleeve coaxial to said bore, the diameters of said bore and journal being substantially equal,
a pin having a first cylindrical portion in radial load carrying engagement with said bore and journal and a second cylindrical portion coaxial to said first portion and extending axially outward from the side of said one wall remote from said other wall,
abutment means on said pin in axial thrust transmitting relation to the side of said one wall remote from said other wall,
fastening means releasably securing said pin and sleeve in telescopic relation to one another and in axial thrust transmitting relation with said one wall,
an apron pivotally connected to said cylindrical portion of said sleeve intermediate said walls and
a draft frame pivotally connected to said second cylindrical portion of said pin.

No references cited.

ANTONIO F. GUIDA, *Primary Examiner.*
A. E. KOPECKI, *Assistant Examiner.*